United States Patent
Wappes, II et al.

(10) Patent No.: US 7,201,530 B2
(45) Date of Patent: Apr. 10, 2007

(54) ADJUSTABLE TORQUE ROD

(75) Inventors: John R. Wappes, II, Lancaster, SC (US); Robert Miller, Rock Hill, SC (US); Markus Huelsmann, Charlotte, NC (US)

(73) Assignee: ZF-Lemforder Corporation, Northville, MI (US)

( * ) Notice: Subject to any disclaimer, the term of this patent is extended or adjusted under 35 U.S.C. 154(b) by 675 days.

(21) Appl. No.: 10/213,978

(22) Filed: Aug. 7, 2002

(65) Prior Publication Data

US 2004/0028468 A1 Feb. 12, 2004

(51) Int. Cl.
*B62D 7/20* (2006.01)

(52) U.S. Cl. .................. 403/27; 280/93.51; 403/109.1; 403/373

(58) Field of Classification Search .............. 74/579 R; 403/27, 187, 188, 109.1, 110, 300–305, 289, 403/290, 373, 374.1–374.4; 280/93.501, 280/93.51, 93.512
See application file for complete search history.

(56) References Cited

U.S. PATENT DOCUMENTS

| | | | | |
|---|---|---|---|---|
| 2,295,357 A | * | 9/1942 | Ryan et al. ...................... 403/27 |
| 2,451,062 A | * | 10/1948 | Booth ........................ 403/290 |
| 3,938,822 A | * | 2/1976 | Guerriero .............. 280/86.758 |
| 3,989,394 A | * | 11/1976 | Ellis .............................. 403/46 |
| RE31,013 E | * | 8/1982 | Smith, Jr. ..................... 403/27 |
| 4,461,063 A | | 7/1984 | Patton ....................... 29/175 R |
| 4,557,622 A | | 12/1985 | Chalmers ..................... 403/388 |
| 6,003,886 A | * | 12/1999 | Kiesel .................... 280/86.757 |
| 6,074,125 A | * | 6/2000 | Krawczak ................. 403/374.3 |
| 6,579,025 B1 | * | 6/2003 | Sokolihs et al. .............. 403/44 |
| 2002/0102132 A1 | * | 8/2002 | Carreira ....................... 403/366 |
| 2002/0136596 A1 | * | 9/2002 | Mouro ....................... 403/316 |

FOREIGN PATENT DOCUMENTS

JP 2000199507 A * 7/2000

OTHER PUBLICATIONS

Jay Kopycinski, "Quick-Release Torque Rod" from www.off-road.com website, 1998.

* cited by examiner

*Primary Examiner*—James R. Brittain
(74) *Attorney, Agent, or Firm*—Gifford, Krass, Sprinkle, Anderson & Citkowski, P.C.

(57) ABSTRACT

An adjustable torque rod comprising includes an adjusting sleeve, a housing and a rod. The adjusting sleeve includes a center surface, a first end and a second end. The housing has a receiving end that is rotatably connected to the second end of said adjusting sleeve. An attachment end of the housing, opposite the receiving end, includes a bushing for use in connecting the housing to a vehicle. A clamp is positioned proximate the receiving end for fixing the adjusting sleeve into a position in the receiving end of the housing. The rod has an adjustment end and a mounting end. The adjustment end is rotatably connected to the first end of the adjusting sleeve. The mounting end, opposite the adjustment end, includes a bushing for use in connecting the rod to a vehicle. The torque rod is extended and retracted by rotation of the adjusting sleeve.

13 Claims, 2 Drawing Sheets

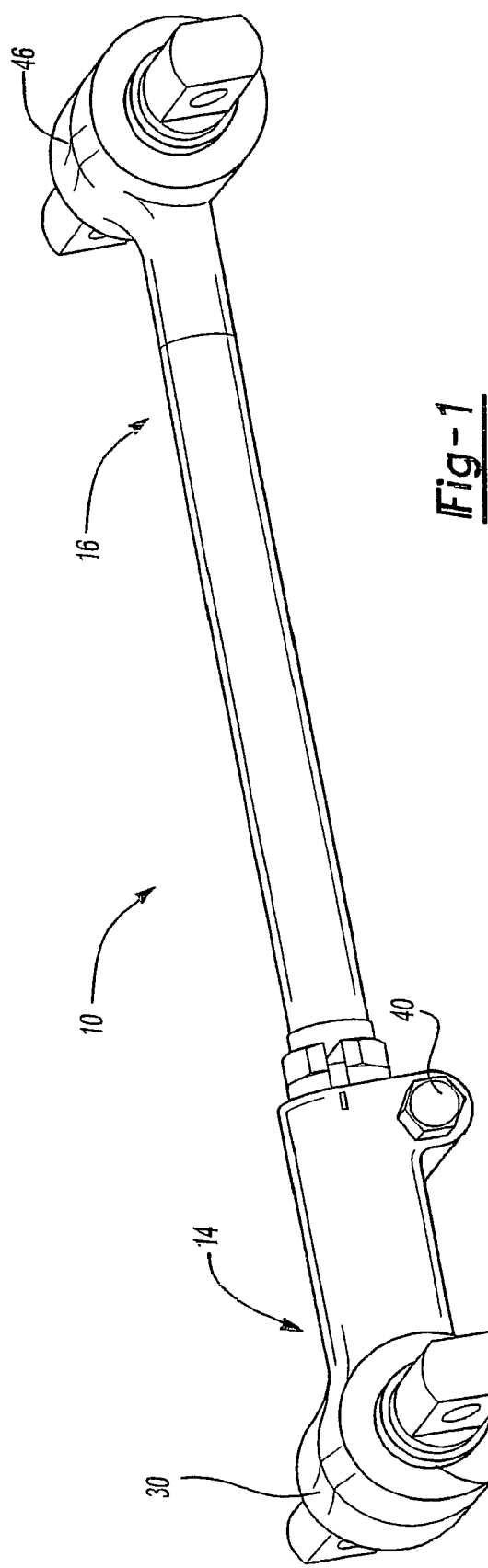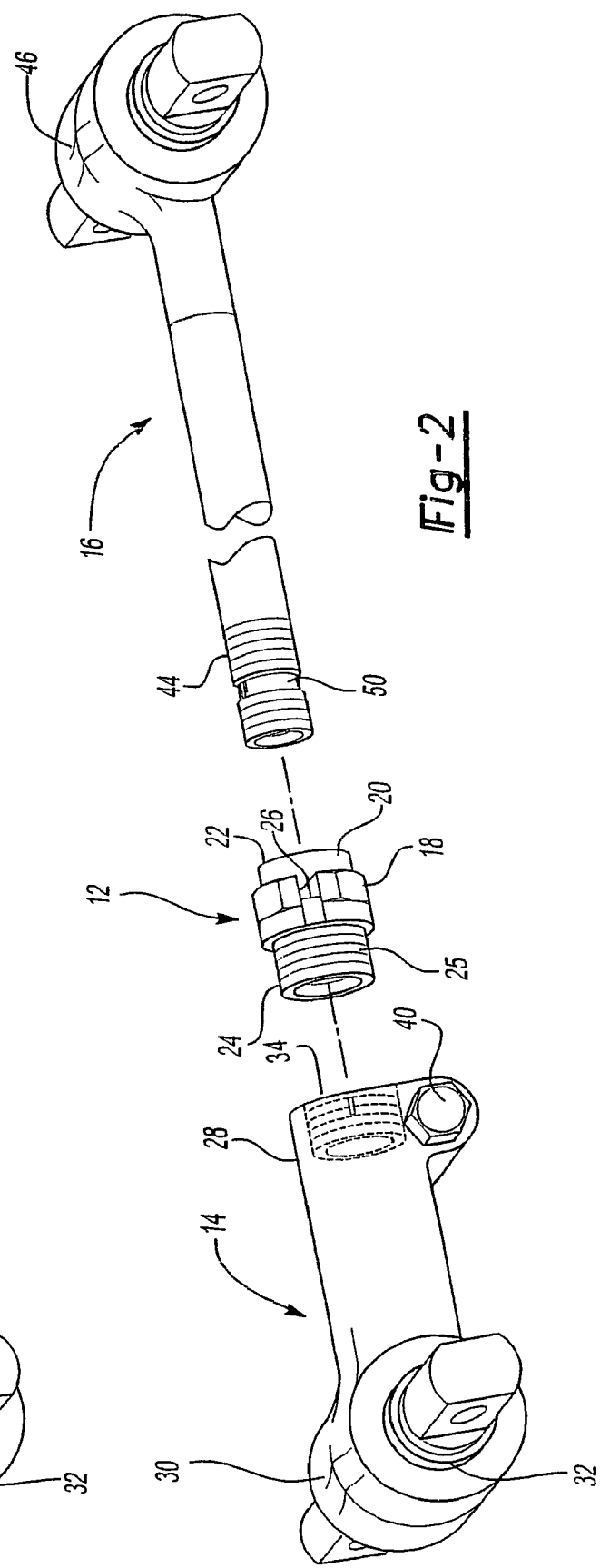

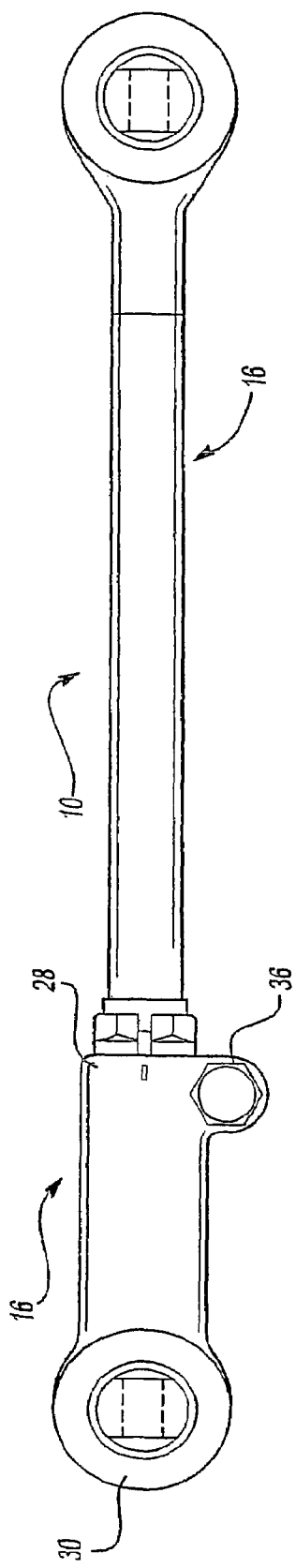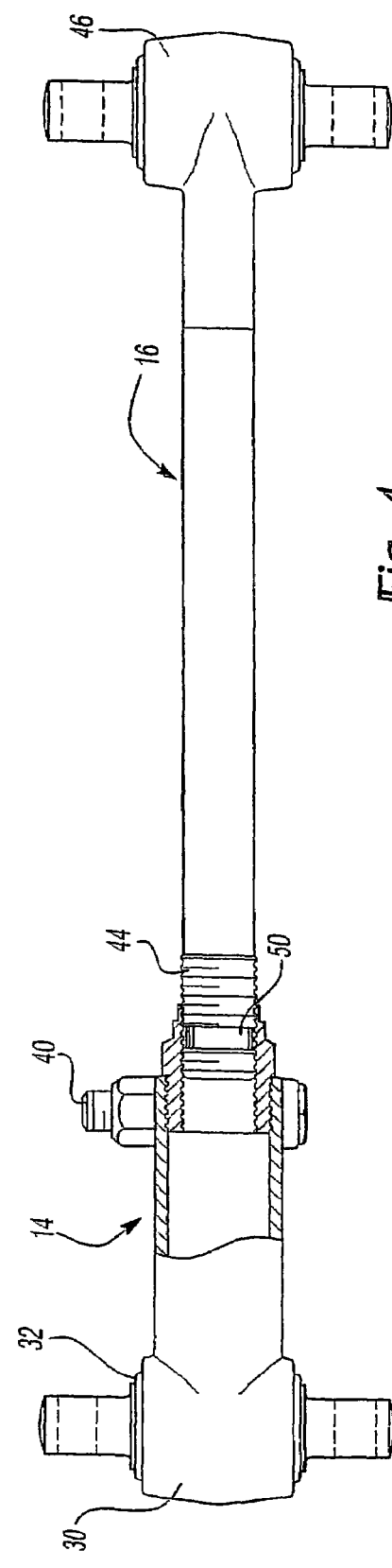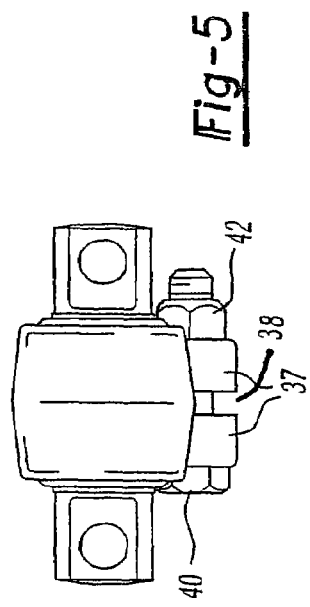

ADJUSTABLE TORQUE ROD

BACKGROUND OF THE INVENTION

1. Field of the Invention

The present invention is directed to an adjustable torque rod. More particularly, the present invention is directed to an adjustable torque rod having a sleeve for use in adjusting the rod length.

2. Reference to Related Art

Torque rods are used in the trucking industry to stabilize vehicle axles relative to a vehicle frame. Prior art adjustable torque rods typically include two male threaded ends that are connected to opposing ends of a center tube. Rotation of the center tube adjusts the male ends in a turnbuckle fashion such that the length of the torque rod can be extended or retracted according to the needs of the user. An example of a torque rod that operates in a manner similar to this is shown in U.S. Pat. No. 4,461,063.

One shortfall of this prior art design is that it is difficult for a single person to make adjustments to the length of the rod. Therefore, it would be advantageous to have an adjustable torque rod system with integrated adjustment and clamping features that would enable a single person to easily and quickly adjust the rod.

SUMMARY OF THE INVENTION

The adjustable torque rod of the present invention integrates all clamping and adjusting parts into a single compact system. The result is a torque rod having an overall space envelope that is drastically reduced compared to standard tube-end-clamp style rods. The integration of parts also allows the torque rod to be used in tight clearance areas where it would not be permissible to use an ordinary torque rod.

An adjustable torque rod constructed in accordance with the present invention preferably includes an adjusting sleeve, a housing rotatably connected to one end of the adjusting sleeve and a rod that is rotatably connected to the other end of the adjusting sleeve. In operation, the rotation of the adjusting sleeve in a first direction results in the extension of the torque rod and the rotation of the adjusting sleeve in a second opposite direction result in the retraction of the torque rod.

Preferably, the adjusting sleeve has a hex shaped center surface and a slot for transferring a clamping force. The first end of the adjusting sleeve includes a threaded receptacle. The second end of the adjusting sleeve preferably includes a male threaded portion.

The housing of the torque rod has a receiving end that also includes a threaded receptacle. The threaded receptacle of the housing is adapted to be rotatably engaged by the male threaded portion of second end of the adjusting sleeve. An attachment end, opposite the receiving end, includes a bushing that is used for connecting the housing (and thus one end of the torque rod) to a vehicle. A clamp is positioned proximate the receiving end and is used for fixing the position of the adjusting sleeve in the receiving end of the housing.

The rod has an adjustment end. Preferably, at least a portion of the adjustment end is threaded such that it may be rotatably connected to the first end of the adjusting sleeve. An indicator groove is defined in the threaded portion of the adjustment end to ensure that the adjusting sleeve is not over-rotated and the length of the torque rod is not over-extended. A mounting end, opposite the adjustment end, includes a bushing for use in connecting the rod (and thus the other end of the torque rod) to a vehicle.

The torque rod of the present invention allows a single person to quickly and easily align an axle and/or suspension without removing the torque rod from the vehicle to shim the rods. Additionally, by integrating all adjustment and clamping features, the overall size envelope of the torque rod of the present invention is drastically reduced when compared to standard adjustable rods. The torque rod of the present invention also permits one person to adjust the length using a minimum number of tools.

BRIEF DESCRIPTION OF THE DRAWINGS

A better understanding of the present invention will be had upon reference to the attached drawings wherein like reference numerals refer to like parts throughout and wherein:

FIG. 1 is a perspective view of a preferred embodiment of a torque rod constructed in accordance with the present invention;

FIG. 2 is an exploded perspective view of the torque of FIG. 1;

FIG. 3 is a side view of the torque rod of FIG. 1;

FIG. 4 is a partial cutaway view of the torque rod of FIG. 1; and

FIG. 5 is an end view of the torque rod of FIG. 1.

DETAILED DESCRIPTION OF THE INVENTION

Referring now to FIGS. 1–5, there is shown a torque rod 10 constructed in accordance with a preferred embodiment of the present invention. Preferably, the torque rod 10 includes an adjusting sleeve 12, a housing 14 and a rod 16. The housing 14 and the rod 16 are secured to the adjusting sleeve 12 such that a user can modify the length of the torque rod 10.

Still referring to FIGS. 1–5, the adjusting sleeve 12 preferably includes a center surface 18, a first end 20 having a receptacle 22 and a second end 24 having a male threaded portion 25. The receptacle 22 of the adjusting sleeve 12 is preferably a threaded receptacle. The center surface 18 of the adjusting sleeve 12 is preferably hex shaped such that the center surface 18 that can be easily grasped and manipulated by a tool. Alternatively, the center surface 18 may be grasped and manipulated by a user's hand. One or more slots 26 are also preferably defined in the adjusting sleeve 12 for use, as will be discussed below in, transferring a clamping force.

Still referring to FIGS. 1–5, the housing 14 preferably includes a receiving end 28 and an attachment end 30 opposite the receiving end 28. The attachment end 30 includes a rubber bushing 32 for use, as is known in the art, in connecting the torque rod 10 to a vehicle (not shown). A receptacle 34, preferably a threaded receptacle, is disposed in the receiving end 28 of the housing 14 and is rotatably connected to the male threaded portion 25 of second end 24 of the adjusting sleeve 12.

A clamp 36 is preferably positioned proximate the receiving end 18 of the housing 14 for fixing the adjusting sleeve 12 in the threaded receptacle 34. The clamp 36 includes a slot 38 that is cut into the threaded receptacle 34 and a pair of clamp ears 37 are positioned on each side of the slot 38. A cross bolt 40 extends through the ears 37 and is secured by a nut 42.

Still referring to FIGS. 1–5, the rod 16 preferably includes an adjustment end 44 and a mounting end 46. The mounting end 46 includes a second bushing 48 (as is known in the art) for use in attaching the torque rod 10 to a vehicle (not shown). The adjustment end 44 preferably includes a threaded portion and is rotatably connected to the receptacle 22 of the first end 20 of the adjusting sleeve 20. An indicator groove 50 is also preferably defined on the threaded portion of the adjustment end 44 of the rod 16. During installation of the torque rod 10, discussed below, the indicator groove 50 enables a user to visually monitor the adjusted length of the torque rod 10 and to ensure that the rod 10 is not over-adjusted. It will be appreciated that the rod 16 may include more than one indicator groove 50. However, if only one indictor groove 50 is provided, that groove preferably indicates the maximum extension length for the torque rod 10.

In operation, after the bushings 32, 48 are connected to a vehicle frame; adjustment to the length of torque rod 10 is affected by rotation of the adjusting sleeve 16. Specifically, the rotation of the adjusting sleeve 12 in a first direction results in the extension, relative to each other, of the rod 16 and housing 14 and the rotation of the adjusting sleeve 12 in a second direction result in the retraction of the rod 16 and housing 14. Therefore, the torque rod is lengthened or shorted by rotation of the adjusting sleeve 12.

Preferably, during an extension of the torque rod 10, a user will visually monitor the adjustment end 44 of the rod 16 for the appearance of the indicator groove 50 to avoid over-extension of the torque rod 10. Once a user has set a proper length for the torque rod 10, the length is fixed by operation of the clamp 36. Specifically, as mentioned above, the slots 26 of the adjusting sleeve 12 transfer the force of the clamp 36 to the rod 16. The tightening of the cross bolt 40 of the clamp 36 closes the clamp 36 and insures that the adjusting sleeve 12 and thus the torque rod 10 is fixed into position.

Having thus described my invention, various embodiments and modifications, which do not depart from the scope of the invention, will become apparent to those having skill in the art.

We claim:

1. An adjustable torque rod comprising:
   an adjusting sleeve having a center surface, a first end and a second end;
   a housing having a receiving end rotatably connected to said second end of said adjusting sleeve, an attachment end opposite said receiving end that is connectable to a vehicle and a clamp proximate said receiving end for fixing said adjusting sleeve in said receiving end; and
   a rod having an adjustment end rotatably connected to said first end of said adjusting sleeve and a mounting end connectable to said vehicle, the adjustment end having an indicator groove disposed thereon, the indicator groove providing a visual indication of a maximum extension length for the rod.

2. The adjustable torque rod of claim 1, wherein said center surface of said adjusting sleeve is hex shaped.

3. The adjustable torque rod of claim 1, wherein said first end of said adjusting sleeve comprises a threaded receptacle.

4. The adjustable torque rod of claim 1, wherein said second end of said adjusting sleeve comprises a male thread portion.

5. The adjustable torque rod of claim 1, wherein said center surface of said adjusting sleeve is hex shaped, said first end of said adjusting sleeve comprises a threaded receptacle and said second end of said adjusting sleeve comprises a male thread portion.

6. The adjustable torque rod of claim 1, wherein said adjusting sleeve comprises a slot for use in transferring a clamping force.

7. The adjustable torque rod of claim 5, wherein said adjusting sleeve comprises a slot for transferring a clamping force.

8. The adjustable torque rod of claim 1, wherein said attachment end of said housing comprises a bushing that is connectable to said vehicle.

9. The adjustable torque rod of claim 1, wherein said receiving end of said housing comprises a threaded receptacle.

10. The adjustable torque rod of claim 1, wherein said clamp of said housing further comprises a pair of clamps ears.

11. The adjustable torque rod of claim 1, wherein said mounting end of said rod further comprises a bushing that is connectable to said vehicle.

12. The adjustable torque rod of claim 1, wherein said adjustment end of said rod is threaded.

13. An adjustable torque rod comprising:
   an adjusting sleeve having a hex shaped center surface, a slot for transferring a clamping force, a first end that includes a threaded receptacle and a second end that includes a male threaded portion;
   a housing having a receiving end that includes a receptacle that is engaged by and rotatably connected to said male portion of second end of said adjusting sleeve, an attachment end, opposite said receiving end, having a bushing that is connectable to a vehicle and a clamp proximate said receptacle of said receiving end that includes a slot defined in said threaded receptacle and a pair of clamping ears positioned on each side of said slot said for fixing said adjusting sleeve in said receiving end; and
   a rod having an threaded adjustment end rotatably connected to said threaded receptacle of first end of said adjusting sleeve, an indicator groove defined in said threaded adjustment end and a mounting end including a bushing that is connectable to said vehicle, the indicator groove providing a visual indication of a maximum extension length for the rod.

* * * * *

UNITED STATES PATENT AND TRADEMARK OFFICE
CERTIFICATE OF CORRECTION

PATENT NO. : 7,201,530 B2  Page 1 of 1
APPLICATION NO. : 10/213978
DATED : April 10, 2007
INVENTOR(S) : John Wappes It is certified that error appears in the above-identified patent and that said Letters Patent is hereby corrected as shown below:

On the title page item (73), line 2, Assignee, replace "Northville, Michigan" with --Lancaster, SC--

On the title page item (57), line 1, Abstract, replace "comprising includes an" with --comprising an--

Column 4, line 48, replace "an threaded" with --a threaded--

Signed and Sealed this

Twenty-fifth Day of September, 2007

JON W. DUDAS
*Director of the United States Patent and Trademark Office*